(12) United States Patent
Juul

(10) Patent No.: US 11,317,639 B2
(45) Date of Patent: May 3, 2022

(54) SHEA BASED COCOA SUBSTITUTE

(71) Applicant: AAK AB (publ), Malmö (SE)

(72) Inventor: Bjarne Juul, Højbjerg (DK)

(73) Assignee: AAK AB (publ), Malmö (SE)

( * ) Notice: Subject to any disclaimer, the term of this patent is extended or adjusted under 35 U.S.C. 154(b) by 105 days.

(21) Appl. No.: 16/618,528

(22) PCT Filed: Jun. 5, 2018

(86) PCT No.: PCT/SE2018/050586
§ 371 (c)(1),
(2) Date: Dec. 2, 2019

(87) PCT Pub. No.: WO2018/226149
PCT Pub. Date: Dec. 13, 2018

(65) Prior Publication Data
US 2020/0163359 A1  May 28, 2020

(30) Foreign Application Priority Data
Jun. 7, 2017 (SE) .................... 1750717-9

(51) Int. Cl.
*A23G 1/38* (2006.01)
*A23G 1/34* (2006.01)

(52) U.S. Cl.
CPC ........ *A23G 1/38* (2013.01); *A23G 1/34* (2013.01)

(58) Field of Classification Search
CPC .................................. A23G 1/34; A23G 1/38
USPC ........................................................ 426/601
See application file for complete search history.

(56) References Cited

U.S. PATENT DOCUMENTS

| 4,219,584 | A | 8/1980 | Mori et al. |
| 4,229,483 | A | 10/1980 | Oura et al. |
| 4,427,707 | A | 1/1984 | Heine et al. |
| 2006/0222753 | A1 | 10/2006 | Harshberger |
| 2008/0241342 | A1 | 10/2008 | Pearson et al. |

FOREIGN PATENT DOCUMENTS

| EP | 3 175 716 A1 | 6/2017 | |
| JP | 57-91173 | 6/1982 | |
| WO | WO 79/00421 | 7/1979 | |
| WO | WO 80/02636 | 12/1980 | |
| WO | WO-2007047078 A1 * | 4/2007 | ............... A23D 9/00 |
| WO | WO-2011138034 A1 * | 11/2011 | ............... A23D 9/00 |
| WO | WO 2013/091121 A1 | 6/2013 | |
| WO | WO 2013/150101 A1 | 10/2013 | |
| WO | WO 2015/150494 A1 | 10/2015 | |
| WO | WO 2017/055102 A1 | 4/2017 | |
| WO | WO-2017055520 A1 * | 4/2017 | ............. A23G 9/327 |

OTHER PUBLICATIONS

Peanut Butter Eggs, Retrieved from GNPD database, Record ID: 1077144, (Apr. 2009).
International Search Report for International Application No. PCT/SE2018/050586, dated Jul. 3, 2018.
Written Opinion of the International Searching Authority for International Application No. PCT/SE2018/050586, dated Jul. 3, 2018.

* cited by examiner

*Primary Examiner* — Jyoti Chawla
(74) *Attorney, Agent, or Firm* — Finnegan, Henderson, Farabow, Garrett & Dunner, LLP

(57) ABSTRACT

The present invention relates to a cocoa extender composition, said composition comprising 0.1 to 99.9 wt % cocoa residues, 0.1 to 99.9 wt % shea residues, 0 to 85 wt % added vegetable fat, and 0 to 85 wt % added non-vegetable fat. Further, the invention relates to methods of its preparation as well as uses thereof in food products.

27 Claims, No Drawings

SHEA BASED COCOA SUBSTITUTE

This application is a national stage filing under 35 U.S.C. § 371 of International Application No. PCT/SE2018/050586, filed on Jun. 5, 2018, which claims the benefit of the filing date of Swedish Patent Application No. 1750717-9, filed on Jun. 7, 2017, each of which is incorporated herein by reference.

TECHNICAL FIELD

The present invention relates to the field of chocolate making. More particularly, the invention relates to cocoa substitute for use in chocolate and chocolate like products.

BACKGROUND

Cocoa powder is today used widely in all kind of food applications with a preference to chocolate, chocolate like products and chocolate confectionary. Cocoa powder is made from cocoa residues which are the remaining mixture of solids and residual fat after cocoa butter is pressed or extracted from cacao beans. The cocoa residue ends up as a powder—cocoa powder or just cocoa—when grinded, or cocoa mass if not grinded and with a higher fat content compared to cocoa powder.

Cocoa powder is expensive and many bakery and chocolate producers would like to have a cost saving. Thus, there have been several attempts from the industry to dilute the cocoa powder and use cocoa powder substitutes or extenders to reduce price and get cost savings.

Locust bean gum powder is one of the cocoa powder substitutes on market. However, the Locust bean gum powder has a bit of coffee taste which minimizes the amount to be added.

Soya bean flour has been another used bulk ingredient to replace cocoa powder but taste is not similar and it is white/yellow which also then impact the colour of the final product.

WO02/065857 relates to an improved method for treating solvent extract plant residues, whereby such treatment reduces wearing of milling equipment caused by presence of soil particles and hard plant parts. Said improved method also reduces the residual solvent to an acceptable level for food applications.

EP2653038 relates to the use of shea tree (*Butyrospermum parkii*) fruit residues as a component in animal feed or for gardening purpose.

There is thus a need for a cocoa power replacer that does not affect taste nor colour to the same extent as the replacers know in the art, further bringing reduced costs to food applications using cocoa and a more cost efficient solution to pure cocoa. The present invention addresses such needs and interests.

SUMMARY

In one aspect, the present invention relates to a cocoa extender composition (CEC), said composition comprising
  0.1 to 99.9 wt % cocoa residues (CR),
  0.1 to 99.9 wt % shea residues (SR), and
  0 to 85 wt % added vegetable fat (AVF)
  0 to 85 wt % added non-vegetable fat (ANVF).

The cocoa extender composition or any of its embodiments may have a total fat content (TFC) 0.1 to 85 wt %, such as 0.1 to 80 wt %, 0.1 to 70 wt %, 0.1 to 60 wt %, 0.1 to 55 wt %, 0.1 to 50 wt %, 0.1 to 25 wt %, 0.1 to 5 wt %, 10 to 25 wt %, or even 45 to 60 wt % of the cocoa extender composition.

Further embodiments are wherein the cocoa extender composition or any of its embodiments may have 0.1 to 70 wt % shea residues, such as 0.1 to 60 wt %, 0.1 to 50 wt %, 0.1 to 40 wt %, 0.1 to 30 wt %, 0.1 to 20 wt %, 0.1 to 10 wt %, 0.1 to 5, 4, 3, 2, or even 1 wt % shea residues of the cocoa extender composition.

Further embodiments of the cocoa extender composition or any of its embodiments may have 0.1 to 70 wt % cocoa residues, such as 0.1 to 60 wt %, 0.1 to 50 wt %, 0.1 to 40 wt %, 0.1 to 30 wt %, 0.1 to 20 wt %, 0.1 to 10 wt %, 0.1 to 5, 4, 3, 2, or even 1 wt % cocoa residues of the cocoa extender composition.

Further embodiments of the cocoa extender composition or any of its embodiments are wherein the shea residues have 0.1 to 50 wt % fat, such as 0.1 to 40 wt %, 0.1 to 30 wt %, 0.1 to 25 wt %, 0.1 to 20 wt %, 0.1 to 15 wt %, 0.1 to 10 wt %, 0.1 to 5 wt %, or even 0.1 to 4, 3, 2, or 1 wt %.

Even further embodiments of the cocoa extender composition or any of its embodiments are wherein the cocoa residues have 0.1 to 60% fat, such as 0.1 to 55 wt %, 0.1 to 50 wt %, 0.1 to 40 wt %, 0.1 to 30 wt %, 0.1 to 20 wt %, 0.1 to 15 wt %, 0.1 to 10 wt %, 0.1 to 5 wt %, or such as 10 to 25 wt %, 45 to 60 wt %, or 0.1 to 2 wt %.

Still even further embodiments are wherein the cocoa extender composition or any of its embodiments further comprises one or more selected from a colourant, a flavor, an emulsifier, and an antioxidant.

Still even further embodiments are wherein the cocoa extender composition or any of its embodiments consist of cocoa residues and shea residues and added vegetable fat. Even further embodiments of the cocoa extender composition according and any of its embodiments consists of cocoa residues, shea residues and added non-vegetable fat.

Even further embodiments are wherein the cocoa extender composition or any of its embodiments consists of cocoa residues, shea residues, added vegetable fat and added non-vegetable fat.

Still further embodiments are wherein the cocoa extender composition or any of its embodiments consists of cocoa residues and shea residues.

Further embodiments of the cocoa extender composition or any of its embodiments are wherein the added vegetable fat is 0 to 85 wt % such as 0 to 70 wt %, such as 0.1 to 85 wt % or 0.1 to 70 wt %, 1-60 wt %, 1 to 55 wt % or even 2 to 70 wt %, or from 1 to 3 wt % or such as from 1 to 4, 5, 10, 20, 25, 30, 35, 40, 45, 50, 55, 60, 65, or even up to 70 wt % of the cocoa extender composition.

Further embodiments of the cocoa extender composition or any of its embodiments are wherein the added non-vegetable fat is 0 to 85 wt % such as 0 to 70 wt %, such as 0.1 to 85 wt % or 0.1 to 70 wt %, 1-60 wt %, 1 to 55 wt % or even 2 to 70 wt %, or from 1 to 3 wt % or such as from 1 to 4, 5, 10, 20, 25, 30, 35, 40, 45, 50, 55, 60, 65, or even up to 70 wt % of the cocoa extender composition.

Further embodiments of the cocoa extender composition or any of its embodiments are wherein the added fat is one or more selected from the group consisting of cocoa butter extender (CBE), cocoa butter substitute (CBS), cocoa butter replacer (CBR), a fat or oil from rapeseed, corn, cotton seed, maize, olive, hazelnut, groundnut, palm, such as palm mid fraction (PMF), palm kernel oil (PKO), palm kernel stearin (PKS), shea, illipe, kokum, sal, allanblackia, cocoa, mowrah, mango, sunflower oil, soybean oil, and any fractions and/or blends thereof.

Still further embodiments of the cocoa extender composition any of its embodiments are wherein the vegetable fat, fractions of blends thereof is hydrogenated and/or interesterified.

Even further embodiments of the cocoa extender composition any of its embodiments are wherein the added non-vegetable fat is animal fat such as milk fat.

Further embodiments of the cocoa extender composition or any of its embodiments are wherein the cocoa residues is cocoa powder or cocoa mass and the shea residues is shea meal.

Further aspects of the invention include an edible product comprising a cocoa extender composition any of its embodiments in an amount of 0.1-99.9 wt % of said edible product, such as 20-75 wt %, or 30 to 60 wt %, 0.1-30 wt %, 0.1-25 wt %, 0.1-20 wt %, or even 0.1-10 wt % of said edible product.

Further embodiments of the edible product any of its embodiments are wherein the edible product further comprises
one or more filler in an amount of 0.1-85 wt % of said edible product
water in an amount of 0-20% by weight of said edible product.

Further embodiments of the edible food product any of its embodiments are wherein the one or more filler material is selected from the group consisting of sugar, flour, starch, skimmed milk powder, whole milk powder, whey powder, cocoa powder, coffee powder, food grade organic solid powders, food grade inorganic solid powders, and blends thereof.

Still further embodiments of the edible product any of its embodiments are wherein the edible food product is a filling, such as an interior filling in an extruded product, a cream, a coating, a tablet, a praline without a filling, a molded bar, a cream layer on top of a biscuit or sandwiched between one or more biscuit layers, a compound/chocolate like coating, a chocolate coating, a chocolate, a compound.

Further aspects of the present invention relates to a food product such as a confectionary product, a bakery product, a dairy product, a culinary product or a nutritional product comprising the cocoa extender composition or any of its embodiments or the edible product or any of its embodiments.

Further embodiments of the food product or any of its embodiments are wherein the edible food product is a chocolate, a chocolate like product, a filled chocolate product, a biscuit coated with a cream layer wherein the cream layer as such may optionally be further coated with a coating, a biscuit having a cream layer sandwiched between two or more biscuit layers, extruded products with an interior filling, a baked product, a biscuit, a cookie, baked products with a filling or a coating, a coating, filled or coated confectionery products, filled or coated culinary products, a nutritional liquid, a nutritional drink or a nutritional paste, a cheese such as a soft cheese or a cream cheese, an ice-cream, a coated ice-cream.

Still even further embodiments of the food product or any of its embodiments are wherein the confectionary product is a chocolate or a chocolate like product.

Further aspects of the present invention is a method for producing a cocoa extender composition or any of its embodiments said method comprising the steps of
providing cocoa residues in an amount of 0.1 to 99.9 wt % of the cocoa extender composition,
providing shea residues in an amount of 0.1 to 99.9 wt % of the cocoa extender composition,
providing 0 to 85 wt % added vegetable fat,
providing 0 to 85 wt % added non-vegetable fat,
mixing said cocoa residues, shea residues, added vegetable fat (if any) and added non-vegetable fat (if any) to obtain said cocoa extender composition.

Further aspects of the present invention is a method for producing a cocoa extender composition without cocoa residues (CECwo) according to any of claims 53 to 55, said method comprising the steps of
providing shea residues in an amount of 0.1 to 99.9 wt % of the cocoa extender composition without cocoa residues (CECwo),
providing 0 to 85 wt % added vegetable fat,
providing 0 to 85 wt % added non-vegetable fat,
mixing said shea residues and added vegetable fat (if any) and added non-vegetable fat (if any) to obtain said cocoa extender composition without cocoa residues.

Further aspects of the present invention are uses of a cocoa extender composition or any of its embodiments or produced by the method or any of its embodiments in an edible product or a food product.

Further use of an edible product or any of its embodiments in a food product are wherein the food product is a confectionary product, such as a chocolate or a chocolate like product, a bakery product, a dairy product, a culinary product or a nutritional product.

Still further use of an edible product or any of its embodiments are wherein the confectionary product is a chocolate or a chocolate like product.

Further aspects of the present invention include use of shea residues in a confectionary product, a bakery product, a dairy product or a nutritional product, wherein said product further comprises cocoa residues. Still further embodiments of said use of shea residues are wherein the cocoa residues is cocoa powder, cocoa liquor or cocoa mass.

Further aspects are the use of shea residues in a confectionary product, a bakery product, a dairy product or a nutritional product, wherein said products further comprises added vegetable fat (AVF) and/or added non-vegetable fat (ANVF).

DETAILED DESCRIPTION

Definitions

As used herein, the term "fatty acid" encompasses fatty acid residues in triglycerides.

As used herein "a cocoa powder extender" is intended to mean "shea residues" and is used interchangeably.

Further, "extender", "replacer" or "substituter" or "substitute" is used interchangeably to denote that something, here cocoa residues, has been extended, replaced or substituted with something else, herein shea residues.

As used herein, "shea nut" or "nut" is intended to mean the kernel of the shea fruit. "Shea nut", "nut" and "shea kernel" is herein used interchangeably.

As used herein, "shea residues" is intended to mean a waste or decay product of shea nuts after production processes of the nuts to extract the fat, also called butter, from the nuts. Shea residues are also called shea meal or shea cake. Shea residues comprise two parts; the shea solids as well as residual fat, if any, after the processing.

As used herein, "cocoa residues" is intended to mean a waste or decay product of cocoa beans after production processes of the beans to extract the fat, also called butter, from the bean. Cocoa residues are also called cocoa mass or cocoa cake. Cocoa residues comprise two parts; the cocoa solids as well as residual fat, if any, after the processing.

As used herein, "shea solid(s)" is intended to mean the solid part of the shea residues and comprises primarily of shells, husk, fibers and the fleshy mesocarp. As used herein, the shea solids is intended to mean such solid parts of the shea residues but not including any residual fat/butter of the shea residues.

As used herein, "cocoa solids" is intended to mean the solid part of the cocoa residues and comprise primarily of shells, husk fibers and the fleshy mesocarp. As used herein, the cocoa solids is intended to mean such solid parts of the cocoa residues but not including any residual fat/butter of the cocoa residues.

As used herein, "residual shea fat" in the shea residues is intended to mean the fat left in the shea residues after production processes to extract the shea fat/butter from the shea nut. Accordingly, shea solid(s)+any residual shea fat left in the shea residues after processing to extract the fat/butter from the shea nut=shea residues.

As used herein, "residual cocoa fat" in the cocoa residues is intended to mean the fat left in the cocoa residues after production processes to extract the cocoa fat/butter from the cocoa bean. Accordingly, cocoa solid(s)+any residual cocoa fat in the cocoa residues after processing to extract the fat/butter from the cocoa bean=cocoa residues.

As used herein "edible" is something that is suitable for use as food or as part of a food product, such as a dairy, confectionary, culinary, bakery or nutritional product. An edible fat is thus suitable for use as fat in food or food product and an edible composition is a composition suitable for use in food or a food product, such as for example a confectionary, bakery, dairy, culinary or nutritional product.

The term "vegetable oil" is intended to mean an oil or fat originating from a plant. Thus, a vegetable fat or vegetable triglycerides are still to be understood as vegetable fat or oil or vegetable triglycerides after fractionation, hydrogenation and/or interesterification etc.

The term "non-vegetable" in the context of "non-vegetable triglyceride" or "non-vegetable fat" when used herein is intended to mean obtained from other sources than vegetable oils Examples of non-vegetable triglycerides may for example be, but are not limited to, triglycerides obtained from unicellular organisms, such as single cell oils, or animal sources. Similar as for vegetable fats and oils, non-vegetable fat or non-vegetable triglycerides are still to be understood as non-vegetable fat or oil or non-vegetable triglycerides after fractionation, hydrogenation and/or interesterification etc.

As used herein a "chocolate-like" product is meant a product, which at least is experienced by the consumer as chocolate or as a confectionery product having sensorial attributes common with chocolate, such as e.g. melting profile, taste etc.

Chocolate-like products include, but are not limited to, compounds.

As used herein, "interesterification" should be understood as replacing one or more of the fatty acid moieties of a triglyceride with another fatty acid moiety or exchanging one or more fatty acid moieties from one triglyceride molecule to another. A fatty acid moiety may be understood as a free fatty acid, a fatty acid ester, a fatty acid anhydride, an activated fatty acid and/or the fatty acyl part of a fatty acid. The term 'interesterification' as used herein may be used interchangeably with 'transesterification'. The interesterification process may be an enzymatic interesterification or chemical interesterification. Both chemical interesterification and enzymatic interesterification is described well in the art. Both chemical and enzymatic interesterification may be done by standard procedures.

As used herein "cocoa butter equivalent" (CBE) is intended to mean an edible fat having very similar physical properties and being compatible with cocoa butter without any significant effect on the behavior of the chocolate. In both cocoa butter and cocoa butter equivalent the fatty acids are typically palmitic, stearic and oleic acids and the triglycerides are typically 2-oleic acid 1,3-di-saturated fatty acids (SatOSat). In spite of their similarity to cocoa butter, cocoa butter equivalents can be detected in chocolate by their triglyceride ratios which are appreciably different from those in cocoa butter. Cocoa butter equivalents are traditionally made from a mix of palm mid fraction and a fractionated part of shea stearin.

As used herein "cocoa butter replacer" (CBR) is intended to mean fats that can replace cocoa butter. Normally it is made of fractionated fats such as for example palm oil or hydrogenated soybean oil fractions. CBRs have a reasonable compatibility with cocoa butter within a certain amount.

As used herein "cocoa butter substitute" (CBS) is intended to mean a lauric acid containing fat. CBS are a subgroup of what is known as cocoa butter replacers (CBR). CBS is chemically different to cocoa butter, but with some physical similarities. CBS are fats that can be mixed with cocoa butter to a limited extent without significantly altering its melting, rheological and processing properties. CBS do not require tempering since they crystallize spontaneously in the stable β' form. Traditionally, CBS is lauric based and contains palm oil, palm mid-fractions, palm kernel oil and related products.

As used herein, "oil" and "fat" is used interchangeably, unless otherwise specified.

As used herein, the term "fatty acid" encompasses free fatty acids and fatty acyl residues in triglycerides.

As used herein, the term "triglycerides" may be used interchangeably with the term 'triacylglycerides' and should be understood as an ester derived from glycerol and three fatty acids. "Triglycerides" may be abbreviated TG or TAG.

As used herein, cocoa mass and cocoa liquor is used interchangeably.

As used herein, "%" or "percentage" all relates to weight percentage i.e. wt % or wt-% if nothing else is indicated.

As used herein, the singular forms "a", "an" and "the" include plural referents unless the context clearly dictates otherwise.

As used herein, "at least one" is intended to mean one or more, i.e. 1, 2, 3, 4, 5, 6, 7, 8, 9, 10, etc.

As revealed above, it is provided a cocoa substitute, herein also called cocoa replacer or cocoa extender. The cocoa substitute is according to the invention provided in a cocoa extender composition (CEC) comprising shea residues (SR) as the cocoa extender/substitute/replacer, as well as cocoa residues (CR) such as cocoa powder or cocoa mass (cocoa liqour). Said cocoa extender composition has a taste as cocoa and may be used to replace in all applications where cocoa, such as cocoa powder or cocoa mass is used. Further examples are given herein.

The cocoa extender composition (CEC) may be used in a food product such as a final bakery or confectionary product, eg. in a chocolate or chocolate like product including but not limited to a compound, but also in a dairy, culinary or a nutritional product.

It has surprisingly been found that it is possible to partly substitute cocoa residues with shea residues and get the same sensory in the final product. Further, it was also found that apart from preserving the sensory, other properties was improved like texture and bloom inhibition, giving a harder product as well as better heat stability for the final product. This means that the shelf life of the final product will improve, a further benefit of the present invention.

Further, shea residues is made from pressed and/or solvent extracted shea nuts and said shea residues has because of that also a lower fat content than the original nut. The shea residues can, after evaporation of solvent, be handle in several different production steps like one or more of drying, grinding e.g. to powder, roasting, alkalizing and mixing steps depending on the final use and context in the final product.

When producing shea butter (the fat from the shea nut) or cocoa butter (the fat from the cocoa bean) the production process comprises a pressing step that produces a press cake as a by-product, often considered as a waste product. The press cake comprises plant residues with a reduced fat content, herein denoted shea residue(s) or cocoa residue(s). The press cake is often used as animal feed, when suited, or just disposed by e.g. combustion. Cocoa press cake may also be used as colorant or aroma.

Often solvent extraction is used in the production process of the fat from the shea nut or cocoa bean. Solvent extraction produces a solvent extracted plant residue often also referred to as meal. As used herein, such meal made from shea nut or cocoa bean is an example of shea residues or cocoa residues.

In the processing step, there may be a heating step (roasting) that usually precedes the milling and pressing steps. The press cake may then further be broken and pulverized into a cocoa powder or shea powder suited for human consumption. The cocoa powder or shea powder have a low level of residual fat, usually below <25%. If a higher amount of residual fat is present, such as >40% e.g. >45% of residual fat is left in the cocoa residues or shea residues after pressing, the cake will be more viscous and after brief heating step form cocoa mass or cocoa liquor with a higher fat content. The pressing and extractions of the shea nut and cocoa bean will determine how much residual fat is left in the cocoa residues or shea residues. The pressing and extraction of cocoa bean and shea nut is well known to someone skilled in the art. It is further described in general in "Bailey's Industrial Oil and Fat Products", Wiley Interscience Publication, Vol. 2, Fourth Edition, 1982, especially the section "Mechanical Expression of Oil and Solvent Extraction", Chapter 3, p. 201-245, discloses production of vegetable oils and fats in general, incorporated herein as reference.

Thus, in one aspect, the present invention relates to a cocoa extender composition (CEC), said composition comprising
  0.1 to 99.9 wt % cocoa residues (CR),
  0.1 to 99.9 wt % shea residues (SR), and
  0 to 85 wt % added vegetable fat (AVF)
  0 to 85 wt % added non-vegetable fat (ANVF).

The cocoa extender composition is in all its embodiments edible.

Cocoa residues as well as shea residues are both a waste or decay product after production processes where the fat, also called butter e.g. cocoa butter and shea butter respectively, has been removed all or partially from the fruit. Said residues of both shea and cocoa origin comprise a solid part and a residual fat part after pressing. After partial or fully removal of the fat/butter from the fruit the fleshy mesocarp, the shell and the husk are left as residual material along with residual fat left, here cocoa residues of shea residues, respectively. Depending on how much fat/butter that is removed in the production process of the fat/butter from the fruit, the residues may have different fat levels left in the residues. As used herein, "residues" such as cocoa residues or shea residues is intended to mean the left-overs from the production processes of the fat/butter from the fruit and thus comprises or consists of a solid part, cocoa solids or shea solids, and a residual fat part, cocoa fat/butter or shea fat/butter. The residual fat part in the cocoa or shea residues may be very low, such as 0.1 wt % of the residues, or even undetectable, meaning fat free or as close to 0 as detection method permits. The upper level is normally around 60% of fat/butter in the cocoa residues or shea residues. Further examples are given herein. The solid part is left-overs comprising mainly fibers, shells, husk and mesocarp. As used herein, solids, such as cocoa solids or shea solids is the left-overs excluding the residual fat/butter part of the cocoa or shea residues.

The above means that the 0.1-99.9% cocoa residues and 0.1-99.9% shea residues in the cocoa extender composition comprises some residual fat that may vary, depending on the production process it is a left-over from.

Further, the cocoa extender composition comprises 0 to 85 wt % added vegetable fat (AVF), such as 0 to 80 wt %, 0 to 75 wt %, 0 to 70 wt %, 0 to 65 wt %, 0 to 60 wt %, 0 to 50 wt %, 0 to 40 wt %, 0 to 30 wt %, 0 to 20 wt %, 0 to 10 wt %, 0 to 5 wt %, or 1 to 85 wt %, 1 to 80 wt %, 1 to 75 wt %, 1 to 70 wt %, 1 to 65 wt %, 1 to 60 wt %, 1 to 50 wt %, 1 to 40 wt %, 1 to 30 wt %, 1 to 20 wt %, 1 to 10 wt %, 1 to 5 wt %, 1 to 2 wt %, or even 0.1 to 1 wt % and 0 to 85 wt % added non-vegetable fat (ANVF) such as 0 to 80 wt %, 0 to 75 wt %, 0 to 70 wt %, 0 to 65 wt %, 0 to 60 wt %, 0 to 50 wt %, 0 to 40 wt %, 0 to 30 wt %, 0 to 20 wt %, 0 to 10 wt %, 0 to 5 wt %, or 1 to 85 wt %, 1 to 80 wt %, 1 to 75 wt %, 1 to 70 wt %, 1 to 65 wt %, 1 to 60 wt %, 1 to 50 wt %, 1 to 40 wt %, 1 to 30 wt %, 1 to 20 wt %, 1 to 10 wt %, 1 to 5 wt %, 1 to 2 wt %, or even 0.1 to 1 wt %.

The total fat content (TFC) of the cocoa extender composition may thus vary, depending on the amount of residual fat in the cocoa residues and the shea residues, as well as amount of added vegetable fat (AVF) the latter of course if added.

Further embodiments of the cocoa extender composition (CEC) are wherein said composition has a total fat content (TFC) of 0.1 to 85 wt %, such as 0.1 to 80 wt %, 0.1 to 70 wt %, 0.1 to 60 wt %, 0.1 to 55 wt %, 0.1 to 50 wt %, 0.1 to 25 wt %, 0.1-5 wt %, 10-25 wt %, or even 45-60 wt % of the cocoa extender composition. Even further embodiments have below 2 wt % of a TFC in the cocoa extender composition (CEC).

Further embodiments are wherein the CEC and all its embodiments have 0.1 to 90 wt % shea residues, such as 0.1 to 80 wt %, 0.1 to 70 wt % shea residues, or even such as 0.1 to 60 wt %, 0.1 to 50 wt %, 0.1 to 40 wt %, 0.1 to 30 wt %, 0.1 to 20 wt %, 0.1 to 10 wt %, 0.1 to 5, 4, 3, 2, or even to 1 wt % shea residues of the cocoa extender composition.

Further embodiments are wherein the CEC and all its embodiments have 0.1 to 90 wt % cocoa residues, such as 0.1 to 80 wt %, 0.1 to 70 wt % cocoa residues, or such as 0.1 to 60 wt %, 0.1 to 50 wt %, 0.1 to 40 wt %, 0.1 to 30 wt %, 0.1 to 20 wt %, 0.1 to 10 wt %, 0.1 to 5, 4, 3, 2, or even to 1 wt % cocoa residues of the cocoa extender composition.

Further embodiments of the CEC and all its embodiments are wherein the shea residues have 0.1 to 50 wt % fat, such as 0.1 to 40 wt %, 0.1 to 30 wt %, 0.1 to 25 wt %, 0.1 to 20 wt %, 0.1 to 15 wt %, 0.1 to 10 wt %, 0.1 to 5 wt %, or even 0.1 to 4, 3, 2, or to 1 wt %. In even further embodiments, the shea residues have below 2 wt % of fat/butter.

Further embodiments of the CEC and all its embodiments are wherein the cocoa residues have 0.1 to 60% fat, such as 0.1 to 55 wt %, 0.1 to 50 wt %, 0.1 to 40 wt %, 0.1 to 30 wt %, 0.1 to 20 wt %, 0.1 to 15 wt %, 0.1 to 10 wt %, 0.1 to 5 wt %, or such as 10-25 wt %, 45 to 60 wt %, or 0.1 to 2 wt %. In even further embodiments, the shea residues have below 2 wt % of fat/butter.

Further embodiments of the CEC and all its embodiments are wherein the CEC further comprises one or more additives selected from a colourant, a flavor, an emulsifier, a preservative, a sweetener and an antioxidant. All amounts of such one or more additives are minor, such as below 5 wt % of the CEC, such as 0.001 to 5 wt %, such as 0.001 to 4, 3, 2, 1 or even to 0.5 or to 0.1 or to 0.01 wt %. In total, the amount of shea residues, cocoa residues, the 0 to 85 wt % AVF and the 0 to 85 wt % of ANVF together with the optional colourant, a flavor, an emulsifier, and an antioxidant will add up to or at least not exceed 100 wt % of the CEC.

Further embodiments are wherein the cocoa extender composition and all its embodiments consists of cocoa residues and shea residues and added vegetable fat (AVF). This means there are no other additives and they add up to 100 wt % of the CEC.

Further embodiments are wherein the cocoa extender composition and all its embodiments consists of cocoa residues and shea residues and added non-vegetable fat (ANVF). This means there are no other additives and they add up to 100 wt % of the CEC.

Further embodiments are wherein the cocoa extender composition and all its embodiments consists of cocoa residues and shea residues and added vegetable fat as well as added non-vegetable fat. This means there are no other additives and they add up to 100 wt % of the CEC.

Further embodiments are wherein the CEC consists of cocoa residues and shea residues. This means there is no added vegetable fat, no added non-vegetable fat or further additives to the CEC and that the cocoa residues and shea residues add up to 100 wt % of the CEC.

Further embodiments of the CEC and all its embodiments are wherein the added vegetable fat is 0 to 85 wt %, such as 0.1 to 85 wt %, 1 to 70 wt %, 0 to 65 wt %, 1 to 65 wt % or even wherein the added vegetable fat is up to 2, 3, 4, 5, 10, 20, 25, 30, 35, 40, 45, 50, 55, 60, 65, 70 or even 85 wt % of the cocoa extender composition. In one embodiment, there is no, e.g. 0 wt %, of added vegetable fat. In summary, the amount of added vegetable fat (AVF) and the residual fat levels in the cocoa residues and the shea residues should sum up to the desired total fat content (TFC) of the cocoa extender composition.

Further embodiments of the cocoa extender composition (CEC) and all its embodiments are wherein the added vegetable fat is any type of vegetable fat or oil, fractions and blends thereof such as one or more selected from the group consisting of cocoa butter extender (CBE), cocoa butter substitute (CBS), cocoa butter replacer (CBR), a fat or oil from rapeseed, corn, cotton seed, maize, olive, hazelnut, groundnut, palm, such as palm oil, palm mid fraction (PMF) and palm kernel oil (PKO), palm kernel stearin (PKS), shea, illipe, kokum, sal, allanblackia, cocoa, mowrah, mango, sunflower oil, soybean oil, and any fractions and/or blends thereof.

Further embodiments of the cocoa extender composition or any of its embodiments are wherein the vegetable fat, fractions of blends thereof is hydrogenated and/or interesterified. Interesterification may be chemical or enzymatic—both alternatives well known to someone skilled in the art. For example, the added vegetable fat may be fully hydrogenated palm kernel stearin. The CEC may comprise both AVF and ANVF as long as the AVF and the ANVF along with residual fat in the shea residues and cocoa residues does not exceed the maximum of TFC in the CEC.

Further embodiments are wherein a non-vegetable fat is added to the CEC or any of its embodiments. A non-vegetable fat may be an animal fat such as milk fat. In some embodiments, said milk fat is from cow. For example, said milk fat may be added as plain milk fat, as fat in milk in such as whole milk or any partly defatted forms of whole milk with a defined amount of fat or even added as milk powder such as whole milk powder. Whole milk powder may also be partly defatted and added as partly defatted milk powder with a defined amount of milk fat. Such partly defatted milk or partly defatted milk powder is known to someone skilled in the art.

Further embodiments are wherein milk fat is added as a non-vegetable fat. For example, the added non-vegetable fat may 0.1 to 85 wt %, such as 0.1 to 80 wt %, 0.1 to 70 wt %, 0.1 to 50 wt %, 0.1 to 40, 30, 20, 10 5 or even 2 wt %. According to further embodiments of the invention said CEC further comprises 0 to 40% milk fat by weight of said cocoa extender composition (CEC), such as 1 to 30% by weight of said CEC, or even 2 to 30% by weight of said CEC, such as 10 to 25% by weight of said CEC.

Further embodiments are wherein fat obtained from unicellular organisms is added as a non-vegetable fat. Fats obtained from unicellular organisms may be obtained by various processes, such as by a process for the preparation of fats, where the process comprises cultivating a fat-producing microorganism and subsequently recovering the fats accumulated in the microorganism. It is known that fats and oils can be produced by cultivating oil/fat-producing microorganisms like algae, bacteria, molds and yeasts. Such microorganisms synthesize the lipids in the ordinary course of their cellular metabolism.

In more detail, such process for production of edible fats may for example include using as a microorganism a mutant of a yeast from the genera *Apiotrichum, Candida, Cryptococcus, Endomyces, Hansenula, Lipomyces, Pichia, Rhodosporidium, Rhodotorula, Saccharomyces, Sporobolomyces, Torulopsis, Trichosporon* and *Yarrowia* or a fusant derived from in total two, three of four, genetically different mutants and/or yeast cells, all belonging to the above mentioned genera, wherein the enzyme system responsible for the conversion of stearic acid into oleic acid is totally or partially genetically blocked.

Thus, a process for the production of a non-vegetable fat obtained from unicellular cells may be used in some embodiments of the invention, where the process comprises cultivating a fat-producing micro-organism in a medium and subsequently recovering the produced fats from the micro-organism, wherein using as a micro-organism a genetically mutagenated strain of the genera Apiotrichum, *Candida Cryptococcus, Endomyces, Hansenula, Lipomyces, Pichia, Rhodosporidium, Brhodotorul a Saccharomvces, Sporobolomyces, Torulopsis, Trichosooron* or *Yarrowia,* wherein the enzyme system responsible for the conversion of C16-C24 saturated fatty acids, such as stearic acids, into oleic acid is totally or partially blocked by the genetic mutagenation or a fusant derived from in total two, three or four genetically different genetically mutagenated strains, all belonging to the above mentioned genera, wherein the enzyme responsible for the conversion of C16-C24 saturated fatty acids, such as stearic acid, into oleic acid is totally or partially blocked by the genetic mutagenation. Further information relating to these embodiments may be found in in the Australian patent AU-B-14153/88.

Another way to obtain edible fats from unicellular organisms may comprise recombinant DNA techniques to produce oleaginous recombinant cells that produce triglyceride oils having desired fatty acid profiles and regiospecific or stereospecific profiles and further extracting the oil, wherein the cell is optionally cultivated heterotrophically. Genes manipulated may include those encoding stearoyl-ACP desaturase, delta 12 fatty acid desaturase, acyl-ACP thioesterase, ketoacyl-ACP synthase, and lysophosphatidic acid acyltransferase and may include FATA thioesterase and the FAD2 fatty acid desaturase genes. The fatty acid profile can be enriched in triglycerides of the SatUSat type, where Sat denotes saturated fatty acid and U denotes unsaturated fatty acid.

In more detail, such unicellular cells for production of edible fats may for example include using as an oleaginous microalgal cell, such as microalgae of the phylum Chlorophtya, the class Trebouxiophytae, the order Chlorellales, or the family Chlorellacae, optionally obligately heterotrophic, and optionally comprising an exogenous sucrose invertase gene so that the cell can grow on sucrose as a sole carbon source, wherein the cell comprises an exogenous gene encoding an active LPAAT enzyme, and the cell produces an oil comprising triglycerides, wherein the oil is, by virtue of the LPAAT activity may be enriched in triglycerides of the SatUSat type, where Sat denotes saturated fatty acid and U denotes unsaturated fatty acid.

The CEC may further for example comprise added vegetable fat. Further embodiments are wherein the total fat content (TFC) of said CEC comprises or consists of 50 wt % vegetable fat obtained by interesterification, 10% vegetable fat from the shea and/or cocoa residues and 10% non-vegetable fat such as milk fat eg from cow. Even further embodiments of said CEC are wherein wherein the TFC of the CEC comprises or consists of 60% added vegetable fat wherein 50 wt % of said added vegetable fat is obtained by interesterification and 10% added non-vegetable fat such as milk fat eg from cow apart from the vegetable fat from the cocoa and/or shea residues. With no other fat components than vegetable fat, as added or from the shea or cocoa residues, and non-vegetable fat such as milk fat in the cocoa extender composition the amounts of vegetable fat—including residual vegetable fat in the shea residues, residual fat in the cocoa residues and added vegetable fat—and the milk fat of course always amount to 100% of the total fat content (TFC) of the CEC. As previously discussed, minor amounts of additives may be added. If additives are added, the amounts of added non-vegetable fat (ANVF), such as milk fat, the vegetable fat, including residual vegetable fat in the shea residues, residual fat in the cocoa residues and added vegetable fat, and further the additives should add up to 100% of the cocoa extender composition. In preferred embodiments of the CEC the cocoa residues is cocoa powder or cocoa mass and the shea residues is shea meal.

According to still further embodiments of the invention said milk fat comprises milk fat obtained from animal origin, such as milk fat obtained from cow, goat, sheep, *lama*, camel, horse, donkey or lamb.

Further embodiments of the cocoa extender composition or any of its embodiments are wherein the cocoa residues is cocoa powder or cocoa mass and the shea residues is shea meal.

Shea residues may contain sapogenins that are associated with bitterness in taste. Reducing levels of sapogenins will thus reduce bitterness of shea residues in a cocoa extender composition. Sapogenins may be reduced from shea residues by a washing step with water and stirring, preferably under heating, for a suitable time till the sapogenins are removed. Such suitable time may be a few minutes up to some few hours, such as e.g. 1 to 180 minutes, 1 to 60 minutes, or 1 to 30 minutes or even 1 to 10 minutes. Applied heating during stirring is also easily optimized by someone skilled in the art and may include all from stirring in room temperature up to 70 degrees Celcius, such as stirring at 20, 25, 30, 35, 40, 45, 50, 55, 60, 65 or even 70 degrees Celsius. Analyzing for sapogenins is done routinely at commercial laboratories. How low levels of sapogenins that are needed for obtaining no bitter taste is a matter of taste of final product and has to be optimized depending on final application and taste.

Accordingly, further embodiments of the cocoa extender composition are wherein the bitterness is reduced. Reduction of bitterness is accomplished by washing shea residues forming part of the cocoa extender composition.

It has been found that taste and colour of a final food product, such as a chocolate or chocolate like product, are affected by pH of the shea residues or of the final cocoa extender composition.

Further embodiments of the cocoa extender composition are thus wherein pH of shea residues, forming part of a cocoa extender composition, or wherein pH of the cocoa extender composition is adjusted to a pH of between 6 to 10, such as 6.0, 6.5, 7.0, 7.5, 8.0, 8.5, 9.0, 9.5 or even 10.0. A pH of 8.0 to 10.0 is preferred to enhance taste and colour of final food product, such as a chocolate or chocolate like product.

Another aspect of the present invention is a cocoa extender composition without cocoa residues (CECwo), said composition comprising or consisting of 0.1 to 99.9 wt % shea residues, 0 to 85 wt % added vegetable fat (AVF) such as 0 to 80 wt %, 0 to 75 wt %, 0 to 70 wt %, 0 to 65 wt %, 0 to 60 wt %, 0 to 50 wt %, 0 to 40 wt %, 0 to 30 wt %, 0 to 20 wt %, 0 to 10 wt %, 0 to 5 wt %, or 1 to 85 wt %, 1 to 80 wt %, 1 to 75 wt %, 1 to 70 wt %, 1 to 65 wt %, 1 to 60 wt %, 1 to 50 wt %, 1 to 40 wt %, 1 to 30 wt %, 1 to 20 wt %, 1 to 10 wt %, 1 to 5 wt %, 1 to 2 wt %, or even 0.1 to 1 wt % and 0 to 85 wt % added non-vegetable fat (ANVF) such as 0 to 80 wt %, 0 to 75 wt %, 0 to 70 wt %, 0 to 65 wt %, 0 to 60 wt %, 0 to 50 wt %, 0 to 40 wt %, 0 to 30 wt %, 0 to 20 wt %, 0 to 10 wt %, 0 to 5 wt %, or 1 to 85 wt %, 1 to 80 wt %, 1 to 75 wt %, 1 to 70 wt %, 1 to 65 wt %, 1 to 60 wt %, 1 to 50 wt %, 1 to 40 wt %, 1 to 30 wt %, 1 to 20 wt %, 1 to 10 wt %, 1 to 5 wt %, 1 to 2 wt %, or even 0.1 to 1 wt %. AVF and ANVF may in further embodiments be as suggested herein for the cocoa extender composition or any of its embodiments.

F.ex. further embodiments of the cocoa extender composition without cocoa residues (CECwo) and all its embodiments are wherein the added vegetable fat is any type of vegetable fat or oil, fractions and blends thereof such as one or more selected from the group consisting of cocoa butter extender (CBE), cocoa butter substitute (CBS), cocoa butter replacer (CBR), a fat or oil from rapeseed, corn, cotton seed, maize, olive, hazelnut, groundnut, palm, such as palm oil, palm mid fraction (PMF) and palm kernel oil (PKO), palm kernel stearin (PKS), shea, illipe, kokum, sal, allanblackia, cocoa, mowrah, mango, sunflower oil, soybean oil, and any fractions and/or blends thereof, and/or wherein the vegetable fat, fractions of blends thereof is hydrogenated and/or interesterified. Interesterification may be chemical or enzymatic—both alternatives are well known to someone skilled in the art. In still further embodiments, said added vegetable fat is fully hydrogenated palm kernel stearin. Added non-vegetable fat (ANVF) may be an animal fat such as milk fat, e.g. form a cow.

Further embodiments of said cocoa extender composition without cocoa residues (CECwo) are wherein said composition and all its embodiments consists of 0.1 to 99.9 wt % shea residues, 0 to 85 wt % added vegetable fat (AVF) such as 0 to 80 wt %, 0 to 75 wt %, 0 to 70 wt %, 0 to 65 wt %, 0 to 60 wt %, 0 to 50 wt %, 0 to 40 wt %, 0 to 30 wt %, 0 to 20 wt %, 0 to 10 wt %, 0 to 5 wt %, or 1 to 85 wt %, 1 to 80 wt %, 1 to 75 wt %, 1 to 70 wt %, 1 to 65 wt %, 1 to 60 wt %, 1 to 50 wt %, 1 to 40 wt %, 1 to 30 wt %, 1 to 20 wt %, 1 to 10 wt %, 1 to 5 wt %, 1 to 2 wt %, or even 0.1 to 1 wt % and 0 to 85 wt % of added non-vegetable fat (ANVF) such as 0 to 80 wt %, 0 to 75 wt %, 0 to 70 wt %, 0 to 65 wt %, 0 to 60 wt %, 0 to 50 wt %, 0 to 40 wt %, 0 to 30 wt %, 0 to 20 wt %, 0 to 10 wt %, 0 to 5 wt %, or 1 to 85 wt %, 1 to 80 wt %, 1 to 75 wt %, 1 to 70 wt %, 1 to 65 wt %, 1 to 60 wt %, 1 to 50 wt %, 1 to 40 wt %, 1 to 30 wt %, 1 to 20, wt %, 1 to 10 wt %, 1 to 5 wt %, 1 to 2 wt %, or even 0.1 to 1 wt %. This means there are no other additives and they add up to 100 wt % of the CEC. In further embodiments, no vegetable fat is added. In even further embodiments, no non-vegetable fat is added.

Further embodiments of said cocoa extender composition without cocoa residues (CECwo) are wherein said composition and all its embodiments comprises or consists of 0.1 to 99.9 wt % shea residues, and 0 to 85 wt % added vegetable fat (AVF), and said 0 to 85% added vegetable fat is fully hydrogenated palm kernel stearin. For example, the shea residues may be 0.1, 1.0, 5.0, 10.0, 15.0, 20.0, 25.0, 30.0, 35.0, 40.0, 45.0, 50.0, 55.0, 60.0, 65.0, 70.0, 75.0, 80.0, 85.0, 90.0, 95.0, 99.0, or even 99.9 wt % shea residues cocoa extender composition without cocoa residues (CECwo) and the fully hydrogenated fat added may be 0.1, 1.0, 5.0, 10.0, 15.0, 20.0, 25.0, 30.0, 35.0, 40.0, 45.0, 50.0, 55.0, 60.0, 65.0, 70.0, 75.0, 80.0, 85.0 wt % of said cocoa extender composition without cocoa residues (CECwo). For embodiments where said cocoa extender composition without cocoa residues (CECwo) consists of 0.1 to 99.9 wt % shea residues, and 0 to 85 wt % added vegetable fat (AVF), no further additives are added and shea residues and AVF sums up to 100%.

Further embodiments of the cocoa extender composition without cocoa residues (CECwo) and all its embodiments are wherein the CECwo further comprises one or more additives selected from a colourant, a flavor, an emulsifier, a preservative, a sweetener and an antioxidant. All amounts of such one or more additives are minor, such as below 5 wt % of the CECwo, such as 0.001 to 5 wt %, such as 0.001 to 4, 3, 2, 1 or even 0.001 to 0.5 wt % or to 0.001 to 0.1 or 0.001 to 0.01 wt %. In total, the amount of shea residues, the 0 to 85 wt % AVF and the 0 to 85 wt % of ANVF together with the optional colourant, a flavor, an emulsifier, and an antioxidant will ad up to or at least not exceed 100 wt % of the CEC.

Another aspect of the present invention is an edible product comprising a cocoa extender composition and all its embodiments or a cocoa extender composition without cocoa residues (CECwo) in an amount of 0.1-99.9 wt % of said edible product, such as 20-75 wt %, or 30 to 60 wt %, 5-40 wt %, 0.1-30 wt %, 0.1-25 wt %, 0.1-20 wt %, or even 0.1-10 wt % of said edible product.

Further embodiments are wherein the edible product and all its embodiments further comprises
one or more filler in an amount of 0.1-85 wt % of said edible product
water in an amount of 0-20 wt % by weight of said edible product.

Amounts of further ingredients, such as filler and water, may vary depending on its specific application; however, such amounts are well known for someone skilled in the art of e.g. confectionary, bakery, nutritional, dairy, and culinary applications and should, of course, amount up to 100% in combination with the cocoa extender composition or the cocoa extender composition without cocoa residues (CECwo) respectively.

Further embodiments of the edible food product and all its embodiments are wherein the one or more filler material selected from the group consisting of sugar, flour, starch, skimmed milk powder, whole milk powder, whey powder, cocoa powder, coffee powder, food grade organic solid powders, food grade inorganic solid powders, and blends thereof. Since whole milk powder also comprises fat is will contribute with added non-vegetable fat to the CEC with the amount of fat added. For example, standard whole milk powders comprise about 26% milk fat and about 74% milk solid as standard. However different defatted forms of whole milk powder exists as for example partly defatted milk powder and even fat free milk powder.

Examples of edible products according to the invention or any of its embodiments may be any edible product which normally comprises cocoa powder such as for example edible products within confectionary applications, dairy applications, bakery applications, and culinary applications, such as for example soft cheese fillings, spreads, soups and dressings, a filling, such as an interior filling in an extruded product, a coating, a tablet, a praline without a filling, a molded bar, a cream layer on top of a biscuit or sandwiched between one or more biscuit layers, a chocolate like coating such as a compound coating, a chocolate coating, a chocolate, a chocolate like product such as a compound.

In another aspect the invention relates to a food product such as a confectionary product, a bakery product, a dairy product, a culinary product or a nutritional product comprising the cocoa extender composition or any of its embodiments or the cocoa extender composition without cocoa residues (CECwo) or any of its embodiments or the edible product or any of its embodiments. Examples of a food product are wherein the edible food product is a chocolate, a chocolate like product, a filled chocolate product, a biscuit coated with a cream layer wherein the cream layer as such may optionally be further coated with a coating, a biscuit having a cream layer sandwiched between two or more biscuit layers, extruded products with an interior filling, a baked product, a biscuit, a cookie, baked products with a filling or a coating, a coating, filled or coated confectionery products, filled or coated culinary products, a nutritional liquid, a nutritional drink or a nutritional paste, a cheese such as a soft cheese or a cream cheese, an ice-cream, a coated ice-cream.

A confectionery food product may for example be filled chocolate-like products, such as pralines, filled and/or coated bars, extruded fillings with or without coating, coatings, such as compound chocolate coatings, or chocolate-like coatings. Examples of bakery food products are for example filled or coated wafers, pies, cakes, croissants, loaves, breadrolls, puff pastries a coated biscuit, a biscuit with a cream layer wherein the cream layer as such may optionally be further coated with a coating, a biscuit having a cream layer sandwiched between two or more biscuit layers etc. A dairy food product is for example coated ice cream. A nutritional food product may for example be a nutritional paste, a nutritional bar or a nutritional drink.

A further embodiment of said food product is a confectionary product a, wherein the confectionary product is a chocolate or a chocolate like product or an enrobed confectionary filling.

Still further embodiments are wherein said food product is a bakery product eg an enrobed cake.

The invention relates in an even further aspect to a method for producing a cocoa extender composition or any of its embodiments, said method comprises the steps of
providing cocoa residues in an amount of 0.1 to 99.9 wt % of the cocoa extender composition,
providing shea residues in an amount of 0.1 to 99.9 wt % of the cocoa extender composition,
providing 0 to 85 wt % added vegetable fat
providing 0 to 85 wt % added non-vegetable fat
mixing said cocoa residues, shea residues, added vegetable fat—if any—and added non-vegetable fat—if any—to obtain said cocoa extender composition.

Still a further aspect is a method for producing a cocoa extender composition without cocoa residues (CECwo) according to any of its embodiments, said method comprising the steps of
providing shea residues in an amount of 0.1 to 99.9 wt % of the cocoa extender composition without cocoa residues (CECwo),
providing 0 to 85 wt % added vegetable fat,
providing 0 to 85 wt % added non-vegetable fat,
mixing said shea residues and added vegetable fat (if any) and added non-vegetable fat (if any) to obtain said cocoa extender composition without cocoa residues.

The steps above in any of the two methods or its embodiments may be done in any order, as long as the mixing is of at least two of the components provided above and stepwise adding the rest of the components or, if convenient, provided all and all mixed in one step. Thus, the shea residues and the cocoa residues may me provided and mixed separately, before the addition of added vegetable fat or added non-vegetable fat, or in any other suitable mixing order. Further embodiments are wherein additives as exemplified herein are provided and further mixed with any of the components or added and mixed all components in one go or at the last mixing step.

The shea residues or the cocoa residues may further be dried, cleaned, alkalised in an alkalising step, grinded and/or roasted after the extraction of fat and before mixing depending on how the residues are to be used and further blended. It may be grinded to a powder if mixed with cocoa residues being powder, such as cocoa powder. The shea residues may further be ground to a mass or paste, like cocoa mass or cocoa liquor, when so desired for example when mixed with residues being cocoa mass. Cocoa residues and shea residues may further be blended as residues after extraction but before any drying, cleaning, alkalizing step, roasting and/or grinding take place, and accordingly having at least one step of drying, roasting and/or grinding left after mixing together. Further, if any of the residues is grinded to a powder, for example a shea powder, it may, of course, be mixed with cocoa mass or liquor or vice versa. Further embodiments are wherein the method or any of its embodiments further comprises at least one of the steps of cleaning, pregrinding, grinding, mixing and grinding, defatting and roasting of shea residues, cocoa residues and blends thereof, before providing at least one of the components or after mixing at least two of the components. The shea residues may also be washed with water to remove or reduce the content of sapogenins to reduce bitterness. Thus, further embodiments are wherein saponins are reduced by at least 5%, 10%, 15%, 20%, 25%, 30%, 40%, 50%, 70%, 80%, 90%, 95% or even 99%. Further embodiments are where the shea residues have been pH adjusted. The pH affects taste and colour of the shea residues and therefore also the final product. Further embodiments are thus wherein pH is adjusted to pH 8, pH 9 or even pH 10, such as for example between pH 8-10, when measured in a 10% shea liqueur solution.

Further aspects of the invention are use of a cocoa extender composition or any of its embodiments or produced by the method or any of its embodiments as described herein in an edible product or a food product.

Further embodiments of said use of an edible product or any of its embodiments in a food product are wherein the food product is a confectionary product, such as a chocolate or a chocolate like product, a bakery product, a dairy product, a culinary product or a nutritional product.

In still further embodiments said use or any of its embodiments are wherein the confectionary product is a chocolate or a chocolate like product.

Further aspects of the invention is use of shea residues in a confectionary product, a bakery product, a dairy product, a culinary product or a nutritional product, wherein said product further comprises cocoa residues. Still further embodiments of said use are wherein the cocoa residues are cocoa powder and/or cocoa liquor/cocoa mass.

Further aspects of the present invention are use of shea residues in a confectionary product, a bakery product, a dairy product or a nutritional product, wherein said products further comprises added vegetable fat (AVF) and/or added non-vegetable fat (ANVF).

Uses of said shea residues further include embodiments where the shea residues have been further treated as exemplified herein for example dried, cleaned, alkalised in an alkalising step, grinded and/or roasted after the extraction of fat and before mixing depending on how the residues are to be used and further blended. The shea residues may also be washed with water to remove or reduce the content of saponins to reduce bitterness. Thus, further embodiments are wherein sapogenins are reduced by at least 5%, 10%, 15%, 20%, 25%, 30%, 40%, 50%, 70%, 80%, 90%, 95% or even 99%. Further embodiments are where the shea residues have been pH adjusted. The pH affects taste and colour of the shea residues and therefore also the final product. Further embodiments are thus wherein pH is adjusted to pH 8, pH 9 or even pH 10, such as for example between pH 8-10, when measured in a 10% shea liqueur solution.

Examples

General Methods

In the below Examples 1-2, Triangle test was used for evaluation according to ISO 4120:2004. In general, the triangle test is a discriminative method used in sensory science to gauge if an overall difference is present between two products and to determine whether a shift in ingredients (or processing) have significantly changed a product. During a triangle test, a panelist is presented with one different and two alike samples. All three samples should be presented to the panelist at once, and the panelist should be instructed to taste the samples from left to right. The six possible order combinations should be randomized across panelists. For samples A and B, the six possible order combinations are:

AAB, ABA, BAA, BBA, BAB, and ABB. The panelist is instructed to identify the odd sample and record his answer.

Data Analysis

For evaluation with the chi-square distribution, use: $X^2=\Sigma(|O-E|)^2/E$, where O=observed and E=expected. To determine the number of expected correct answers, multiply the chance of choosing a correct answer by chance by the total number of panelists. In a triangle test, the probability of a correct answer by chance is ⅓. The probability of choosing an incorrect answer by chance is ⅔.

For all examples below, shea residues used are as defined herein. In brief, it is waste products of shea nuts after fat extraction processes have been done. Said shea residues comprise two parts; the shea solids as well as any residual fat left after the processing.

Example 1—Compound Tablets Made with Cocoa Solids Extended with Shea Residues This Example describes the extension of cocoa powder with shea residues for use in compound tablets. Cocoa solids were replaced with 20% or 30% respectively of shea residues.

All ingredients except lecithin in table 1 is mixed in a Hobart N-50 at 50° C. for 10 minutes and then refined in a Bühler SDY-300 three-roll refiner to a particle size of approximately 20μ. It was then further conched in the Hobert mixer for 6 hours at 60° C. The lecithin was added after 5.5 hours to the chonch.

There is approximately 11% fat left in low fat Cocoa Powder and in this example approximately 2% fat left in the used cocoa powder extender. As seen in the recipe (Table 1) this different fat levels are compensated by extra addition of fat to the different Alternatives (Alternative 1-3 below) so that all final recipes have the same total fat content.

After chonching the compound mass was transferred to a plastic bowl and stored at 45° C. until the whole mass was 45° C.

The 45° C. compound mass was cooled down to 40° C.-42° C. by stirring in open air and then deposited to a 100 g pre-heated plastic mould and cooled for 40 min in a 3 zones Blumen cooling tunnel at 6° C.->6° C.->14° C.

After demoulding the 100 g compound tablet were stored at 20° C.+/−1° C. for 1 week before it was used for different analyses.

TABLE 1

Recipes compound tablets with shea solid extended cocoa powder.

| Ingredients | Reference | Alternative 1 20% substitute | Alternative 2 30% substitute | Alternative 3 30% substitute |
|---|---|---|---|---|
| Sugar | 48.6 | 48.6 | 48.6 | 48.6 |
| Cocoa powder (10-12%) | 15.0 | 12.0 | 10.5 | 10.5 |
| Skim milk powder | 6.0 | 6.0 | 6.0 | 6.0 |
| Fat PKS IV 7 blend *1 | 30.0 | 30.3 | 30.4 | 30.4 |
| Lecitin | 0.4 | 0.4 | 0.4 | 0.4 |
| Shea based cocoa powder extender A *2 | — | 2.7 | 4.1 | — |
| Shea based cocoa powder extender B *3 | — | — | — | 4.1 |
| Total fat content | 31.7 | 31.7 | 31.7 | 31.7 |

*1: PKS IV 7 stands for Palm kernel stearin with an iodine value (IV) at 7. It is a blend of 98% PKS IV 7 and 2% STS (sorbitan tristearate).
*2: Cocoa powder extender A is a shea residue with 2% fat content which is pre-grinded to 150μ.
*3: Cocoa powder extender B is a shea residue with 2% fat content which is roasted 20 min at 160° C. and pre-grinded to 150μ.

The 4 compound tablets (reference and three Alternatives according to the invention) from Table 1 was evaluate in a Triangle test with 10 trained persons and there was found no significant difference between the 4 samples.

Some of the 100 g tablets from Table 1 were stored 1 week at 20° C. and 27° C. before they were penetrated.

The measurement was performed in a Texture Analyser XT2i with a P2N probe set to penetrate 3 mm.

The tabulated values in Table 2 are mean values of five measurements of the penetration force measured in grams.

TABLE 2 mean penetration force of extended compound tablets

| Ingredients | Reference | Alternative 1 20% substitute | Alternative 2 30% substitute |
|---|---|---|---|
| Penetration force in gram after 1 week at 20° C. | 985 | 1036 | 1076 |
| Penetration force in gram after 1 week at 27° C. | 573 | 625 | 637 |

The penetration test gave that addition of cocoa powder extender makes significant more texture at 20° C. as well as at 27° C., and that more extender (30% compared to 20%), gave even slightly more texture.

Sensory evaluation using Triangle test did not find any significant different either. (data not shown)

Some of the 100 g 1 week old tablets from table 1 were tested for bloom at 15° C., 20° C. and 23° C.

Table 3 shows the number of weeks before bloom was significant visible.

TABLE 3

Measurement of bloom in extended compound tablets

| Weeks before visible bloom | Reference | Alternative 1 20% substitute |
|---|---|---|
| 15° C. isoterm | 22 | >52 |
| 20° C. isoterm | >52 | >52 |
| 23° C. isoterm | >52 | >52 |

It is well known that bloom start earlier in compound based on PKS when the temperature is low (such as around 15° C.).

Table 3 shows an example how it is possible to improve bloom stability at 15° C. storage significant by substituting approximately 20% cocoa powder with cocoa powder extender.

Conclusion

It can be concluded that a shea residue based cocoa extender composition, here a cocoa powder extender based on shea solids, is able to substitute minimum 30% of the cocoa powder in a compound recipe without any significant change in sensory.

Measured on a Texture Analyser the shea residue based cocoa solid extender will harden the product and make it more heat resistance as more cocoa powder is substituted. Also bloom resistance will be improved at lower storage temperature even with 20% substitution.

Example 2—Sensory Evaluation after 30% Shea Substitution of Cocoa Powder in a Chocolate Like Product All ingredients except lecithin in table 4 is mixed in a Hobart N-50 at 50° C. for 10 minutes and refined in a Bühler SDY-300 three-roll refiner to a particle size of approximately 20μ and conched in the Hobert mixer for 6 hours at 60° C. The lecithin was added after 5.5 hours to the chonch.

Different fat levels of cocoa solids and shea solids are compensated for the same way as in Example 1 so that all the final recipes in Table 4 have the same total fat content.

After chonching the chocolate mass was transferred to a tempering machine for tempering.

Temper chocolate mass is deposited into 100 g pre-heated plastic mould and cooled for 40 min in a 3 zones Blumen cooling tunnel at 16° C.->12° C.->14° C.

After demoulding the 100 g chocolate tablet was stored at 20° C.+/−1° C. for 1 week before it was used for sensory evaluation in a triangle test.

TABLE 4 recipes of 30% substituted cocoa powder in chocolate

| Ingredients | Reference | Alternative 4 30% substitute |
|---|---|---|
| Sugar | 44.6 | 44.6 |
| Cocoa mass | 50.0 | 41.1 |
| Cocoa butter | 5.0 | 5.0 |
| CBE fat *4 | 0.0 | 5.0 |
| Lecitin | 0.4 | 0.4 |
| Shea based cocoa powder extender B *3 | 0.0 | 3.9 |
| Total fat content | 33.0 | 33.0 |

*3: Cocoa powder extender B is a shea residue with 2% fat content which is roasted 20 min at 160° C. and pre-grinded to 150μ.
*4: CBE stand for Cocoa butter equivalent The two different chocolates from table 4 were evaluated in a triangle test with 10 trained persons and no significant difference in sensory evaluation between the 2 samples was found.

Conclusion—Example 1 and 2

It is possible to partly substitute cocoa solid with a shea based cocoa solid extender in both compounds based on cocoa powder and/or chocolates based on cocoa mass (cocoa liquor) and get the same sensory in the final product. Not only the sensory is kept but also other features are improved like more heat stability, more texture and better bloom stability.

Example 3—Reduction of Bitterness

Shea residues contain saponins. It is possible to reduce the content of saponins in the shea residues by a washing process with water.

1000 g shea residues are grinded to a 100 micron in a Mazzer Major 05-513 grinder and divided in two portions.

A: 500 g grinded shea residues are roasted in an oven for 6 hours at 120° C. and used as a component in compound I recipe in table 4.

B: 500 g grinded shea residues are blended with 4.5 L water and mixed in a Hobert N-50 at 60° C. for 10 minute. Afterwards all the mix is filtered. The washed and filtered shea residues left is forming a shea residues cake and said cake is roasted 6 hours at 210° C. in an oven and used as component in compound II recipe Table 4.

TABLE 5

| Ingredients | Compound I | Compound II |
|---|---|---|
| Sugar | 48.58 | 48.58 |
| FH. Palm kernel stearin | 30.50 | 30.50 |
| Cocoa powder, alkalised | 9.00 | 9.00 |
| Skim milk powder | 6.00 | 6.00 |
| Shea residues A | 5.50 | 0.00 |
| Shea residues B | 0.00 | 5.50 |
| Lecithin | 0.40 | 0.40 |
| Vanillin | 0.02 | 0.02 |

All ingredients except lecithin in Table 4 is mixed in a Hobert N/50 at 50° C. for 10 minutes and then refined in a Bühler SDY-300 three-rolls refiner to a particle size of approximately 20 micron. It was then further chonched in the Hobert mixer for 6 hours at 60° C. The lecithin was added after 5.5 hours to the chonch.

After chonching the compound mass was transferred to a plastic bowl and stored at 45° C. until the whole mass was 45° C.

The 45° C. compound mass was cooled down to 40-42° C. by stirring in open air and then deposited to a 100 g pre-heated plastic mould and cooled for 40 min in a 3 zones Blumen cooling tunnel at 6° C.->6° C.->14° C.

After demoulding the 100 g compound tablet were stored at 20° C.+/−1° C. for 1 week before it was analysed in a sensory panel of 10 persons.

Analysis of Sapogenines in Shea Residues A and B

TABLE 6

Shea residues A

| Sapogenins | Results | Unit of measure | Lower than quantification limit (Lq) | Method |
|---|---|---|---|---|
| Hederagenin | 13.7 | mg/kg | 5.0 | Sapogen-LC-MS/MS |
| Oleanolic acid | <Lq | mg/kg | 5.0 | Sapogen-LC-MS/MS |
| Phytolaccinic acid | <Lq | mg/kg | 5.0 | Sapogen-LC-MS/MS |

TABLE 7

Shea residues B

| Sapogenins | Results | Unit of measure | Lower than quantification limit (Lq) | Method |
|---|---|---|---|---|
| Hederagenin | 11.4 | mg/kg | 5.0 | Sapogen-LC-MS/MS |
| Oleanolic acid | <Lq | mg/kg | 5.0 | Sapogen-LC-MS/MS |
| Phytolaccinic acid | <Lq | mg/kg | 5.0 | Sapogen-LC-MS/MS |

Results 10 out of 10 persons in a test panel found less bitterness in compound II based on the washed shea residues of portion B compared to compound I based on un-washed shea residues of portion A.

Table 6 and 7 shows that sapogenins were reduced after a washing process using water.

Conclusion

This example shows how a waterwash of shea residues are able to reduce the content of sapogenins significantly by—17%.

Further, a compound based on washed shea residues will taste significantly less bitter.

Example 4—Effect of pH on Taste and Colour in Compounds

Shea residues which has been roasted at 120° C. for 30 min was mixed with fully hydrogenated (Fh.) palm kernel stearin to a shea liqueur as shown in Table 8.

TABLE 8

|  | Shea liqueur wt % |
| --- | --- |
| Shea residues | 65 |
| Fh. Palm kernel stearin | 35 |

All are mixed in a Hobert N-50 Mixer for 10 minutes at 60° C. The shea liqueur was divided into three batches; A-C.

A.

Shea liqueur is adjusted to pH 6 by adding a 10% potassium carbonate solution.

The pH value is measured in a 10% shea liqueur solution

Evaluation by test panel: Standard taste and standard colour

B.

Shea liqueur is adjusted to pH 8 by adding a 10% potassium carbonate solution. The pH value is measured in a 10% shea liqueur solution.

Evaluation by test panel: Darker and stronger taste compared to standard (represented by A).

C.

Shea liqueur is adjusted to a pH at 10 by adding a 10% potassium carbonate solution.

The pH value is measured in a 10% shea liqueur solution

Evaluation by test panel: Very dark brown and very strong taste compared to standard (represented by A)

Three compounds are made based on the above three shea residues A to C according to Table 9.

TABLE 9

| Ingredients | Compound III | Compound IV | Compound V |
| --- | --- | --- | --- |
| Sugar | 48.58 | 48.58 | 48.58 |
| Fh. Palm kernel stearin | 28.30 | 28.30 | 28.30 |
| Cocoa powder, alkalised*a* | 10.00 | 10.00 | 10.00 |
| Skim milk powder | 6.00 | 6.00 | 6.00 |
| Shea liqueur A | 6.70 | 0.00 | 0.00 |
| Shea liqueur B | 0.00 | 6.70 | 0.00 |
| Shea liqueur C | 0.00 | 0.00 | 6.70 |
| Lecithin | 0.40 | 0.40 | 0.40 |
| Vanillin | 0.02 | 0.02 | 0.02 |

*a*pH 8.4

All ingredients except lecithin in table 9 is mixed in a Hobert N/50 at 50° C. for 10 minutes and then refined in a Bühler SDY-300 three-roll refiner to a particle size of approximately 20 micron. It is then further chonched in the Hobert mixer for 6 hours at 60° C. The lecithin was added after 5.5 hours to the chonch.

After chonching the compound mass was transferred to a plastic bowl and stored at 45° C. until the whole mass was 45° C.

The 45° C. compound mass was cooled down to 40-42° C. by stirring in open air and then deposited to a 100 g pre-heated plastic mould and cooled for 40 min in a 3 zones Blumen cooling tunnel at 6° C.->6° C.->14° C.

After demoulding the 100 g compound tablet were stored at 20° C.+/−1° C. for 1 week before it was evaluated in a trained sensory panel of 3 persons.

Difference in colour and taste was huge and thereby clearly categorized in three different groups c.f. results below where all are compared to Compound III, which is set as standard.

Thus, for colour, "Brown" is standard brown denoted a (+), with "darker" (++) and "Strong dark" (+++) is ascending scale from brown (+) to strong dark (+++) of the compounds tested.

For taste, Compound III has standard "cocoa taste" denoted (+) with ascending scale "More cocoa taste" (++) and "Strong cocoa taste" (+++) as the strongest cocoa taste of the compounds tested.

Results

TABLE 10

| Colour and taste of compound III, IV and V | | | |
| --- | --- | --- | --- |
|  | Compound III | Compound IV | Compound V |
| Colour | Brown (+) | Darker(++) | Strong dark (+++) |
| Taste | Cocoa taste (+) | More cocoa taste (++) | Strong cocoa taste (+++) |

Conclusion

Example 4 shows how pH of shea liqour impact colour and taste of a final compound. The higher pH value of the shea liqour the more cocoa taste and the darker product.

The invention claimed is:

1. A cocoa extender composition comprising:
   2 to 70 wt % cocoa residues;
   1 to 20 wt % shea residues;
   0 to 50 wt % added vegetable fat; and
   0 to 50 wt % added non-vegetable fat.

2. The cocoa extender composition of claim 1, wherein the cocoa extender composition has a total fat content of 0.1 to 85 wt %.

3. The cocoa extender composition of claim 1, wherein the cocoa extender composition has 1 to 10 wt % shea residues.

4. The cocoa extender composition of claim 1, wherein the cocoa extender composition has 5 to 60 wt % cocoa residues.

5. The cocoa extender composition of claim 1, wherein the shea residues have 0.1 to 50 wt % fat.

6. The cocoa extender composition of claim 1, wherein the cocoa residues have 0.1 to 60 wt % fat.

7. The cocoa extender composition of claim 1, further comprising at least one additional ingredient selected from the group consisting of a colorant, a preservative, a sweetener, a flavor, an emulsifier, and an antioxidant.

8. The cocoa extender composition of claim 1, wherein the cocoa extender composition consists of cocoa residues, shea residues, and added vegetable fat.

9. The cocoa extender composition of claim 1, wherein the cocoa extender composition consists of cocoa residues, shea residues, and added non-vegetable fat.

10. The cocoa extender composition of claim 1, wherein the cocoa extender composition consists of cocoa residues, shea residues, added vegetable fat, and added non-vegetable fat.

11. The cocoa extender composition of claim 1, wherein the cocoa extender composition consists of cocoa residues and shea residues.

12. The cocoa extender composition of claim 1, wherein the added vegetable fat is one or more of cocoa butter extender, cocoa butter substitute, cocoa butter replacer, a fat or oil from rapeseed, corn, cotton seed, maize, olive, hazelnut, groundnut, palm, such as palm mid fraction, palm kernel oil, palm kernel stearin, shea, illipe, kokum, sal, allanblackia, cocoa, mowrah, mango, sunflower oil, soybean oil, and any fractions and/or blends thereof.

13. The cocoa extender composition of claim 1, wherein the added vegetable fat is hydrogenated and/or interesterified.

14. The cocoa extender composition of claim 1, wherein the added non-vegetable fat is animal fat.

15. The cocoa extender composition of claim 1, wherein the cocoa residues are cocoa powder or cocoa mass and the shea residues are shea meal.

16. An edible product comprising the cocoa extender composition of claim 1, wherein the edible product comprises the cocoa extender composition in an amount from 0.1-99.9 wt %.

17. The edible product of claim 16, further comprising: one or more filler in an amount from 0.1-85 wt %; and water in an amount from 0-20 wt %.

18. The edible product of claim 17, wherein the one or more filler is selected from the group consisting of sugar, flour, starch, skimmed milk powder, whole milk powder, whey powder, cocoa powder, coffee powder, food grade organic solid powders, food grade inorganic solid powders, and blends thereof.

19. The edible product of claim 16, wherein the edible product is a filling, a cream, a coating, a tablet, a praline without a filling, a molded bar, a cream layer on top of a biscuit or sandwiched between one or more biscuit layers, a chocolate like coating, a chocolate coating, a chocolate, or a chocolate like product.

20. A food product comprising the cocoa extender composition of claim 1.

21. The food product of claim 20, wherein the food product is a chocolate, a chocolate like product, a filled chocolate product, a biscuit coated with a cream layer, a biscuit having a cream layer sandwiched between two or more biscuit layers, extruded products with an interior filling, a baked product, a biscuit, a cookie, baked products with a filling or a coating, a coating, filled or coated confectionery products, filled or coated culinary products, a nutritional liquid, a nutritional drink or a nutritional paste, or a cheese.

22. The food product of claim 20, wherein the food product is a chocolate or a chocolate like product.

23. A method of producing the cocoa extender composition of claim 1 comprising:
providing cocoa residues in an amount from 2 to 70 wt %;
providing shea residues in an amount from 1 to 20 wt %;
providing 0 to 50 wt % added vegetable fat;
providing 0 to 50 wt % added non-vegetable fat; and
mixing the cocoa residues, shea residues, added vegetable fat, and added non-vegetable fat to obtain the cocoa extender composition.

24. The cocoa extender composition of claim 1, comprising 10 to 50 wt % cocoa residues.

25. The cocoa extender composition of claim 1, comprising 2 to 5 wt % shea residues.

26. The cocoa extender composition of claim 1, comprising 10 to 40 wt % added vegetable fat.

27. The cocoa extender composition of claim 1, comprising 1 to 40 wt % added non-vegetable fat.

* * * * *